(12) United States Patent
Tsurumune

(10) Patent No.: US 8,159,744 B2
(45) Date of Patent: Apr. 17, 2012

(54) LASER SCANNING APPARATUS AND LASER SCANNING MICROSCOPE

(75) Inventor: Atsushi Tsurumune, Odawara (JP)

(73) Assignee: Nikon Corporation, Tokyo (JP)

( * ) Notice: Subject to any disclaimer, the term of this patent is extended or adjusted under 35 U.S.C. 154(b) by 614 days.

(21) Appl. No.: 12/318,132

(22) Filed: Dec. 22, 2008

(65) Prior Publication Data

US 2009/0168157 A1 Jul. 2, 2009

Related U.S. Application Data

(63) Continuation of application No. PCT/JP2007/000656, filed on Jun. 20, 2007.

(30) Foreign Application Priority Data

Jul. 18, 2006 (JP) ................................ 2006-195241

(51) Int. Cl.
G02B 21/06 (2006.01)
G02B 21/36 (2006.01)

(52) U.S. Cl. ...................................... 359/385; 359/369

(58) Field of Classification Search .................. 359/368, 359/369, 385
See application file for complete search history.

(56) References Cited

U.S. PATENT DOCUMENTS

| 5,084,612 A | 1/1992 | Iwasaki et al. |
| 5,187,364 A | 2/1993 | Blais |
| 6,037,583 A | 3/2000 | Moehler et al. |
| 6,639,180 B1 | 10/2003 | De Steur et al. |
| 2002/0196535 A1* | 12/2002 | Knebel et al. ................. 359/385 |
| 2005/0280818 A1 | 12/2005 | Yamashita et al. |
| 2006/0011804 A1 | 1/2006 | Engelmann et al. |
| 2006/0129353 A1* | 6/2006 | Hattori et al. ................. 702/183 |

FOREIGN PATENT DOCUMENTS

| JP | A-61-061123 | 3/1986 |
| JP | A-11-231253 | 8/1999 |
| JP | A-2006-023476 | 1/2006 |

OTHER PUBLICATIONS

Reference Manual "LSM 510 and LSM 510 META Laser Scanning Microscopes" release 3.5, Jan. 2005, pp. 1-602.

* cited by examiner

Primary Examiner — Alessandro Amari
(74) Attorney, Agent, or Firm — Oliff & Berridge, PLC

(57) ABSTRACT

To provide a laser scanning apparatus and a laser scanning microscope capable of securely conducting a condition setting at the time of laser scanning while suppressing a damage on a plane to be irradiated. Accordingly, a laser scanning apparatus includes a light deflecting unit disposed in a light path of laser light directed toward a plane to be scanned, user interfaces through which operational contents of the light deflecting unit are designated by a user, generating units generating driving signals of the light deflecting unit in accordance with the designated operational contents, and testing units test-driving the light deflecting unit with the driving signals while keeping the laser light off and measuring the operational contents of the light deflecting unit during the driving.

8 Claims, 8 Drawing Sheets

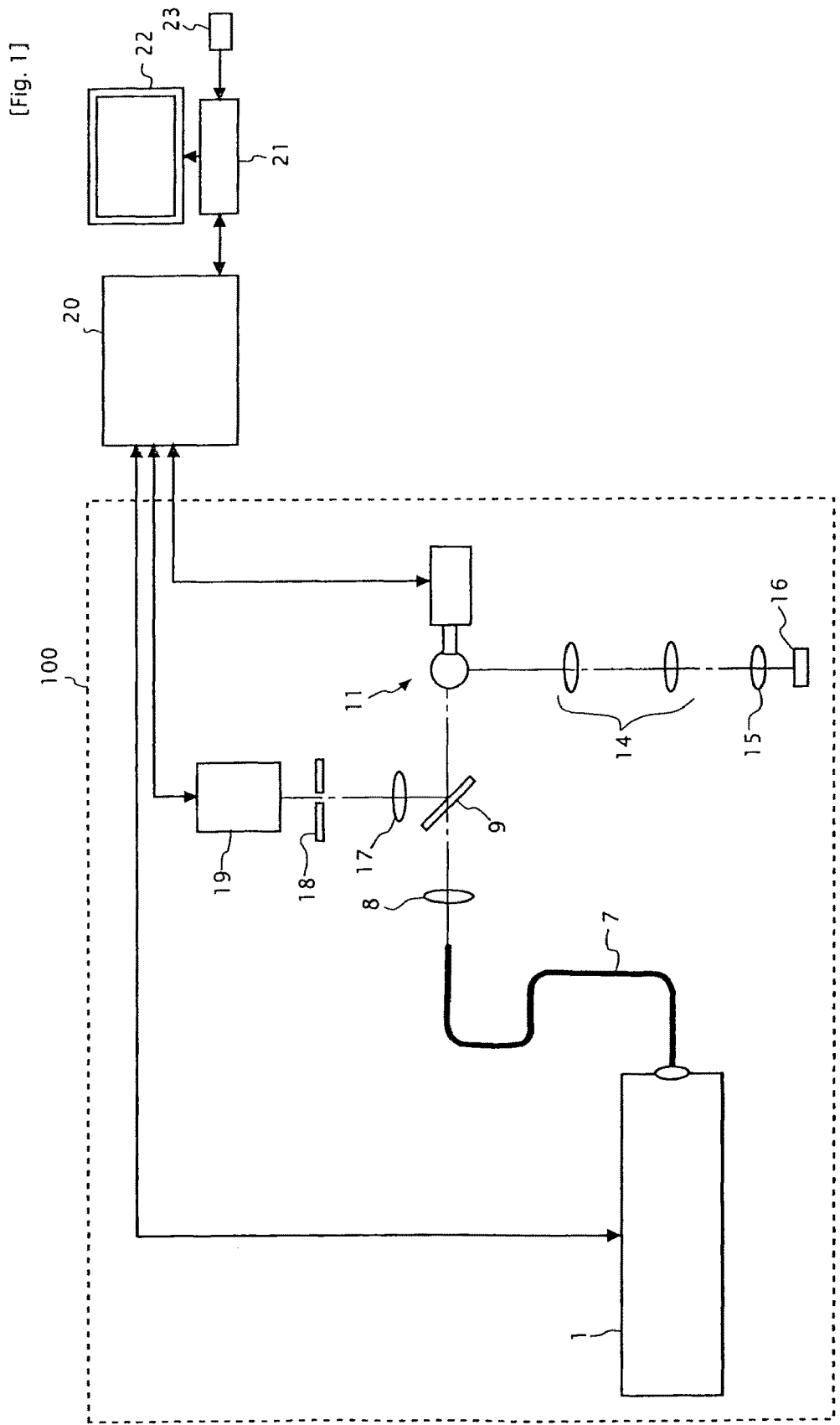

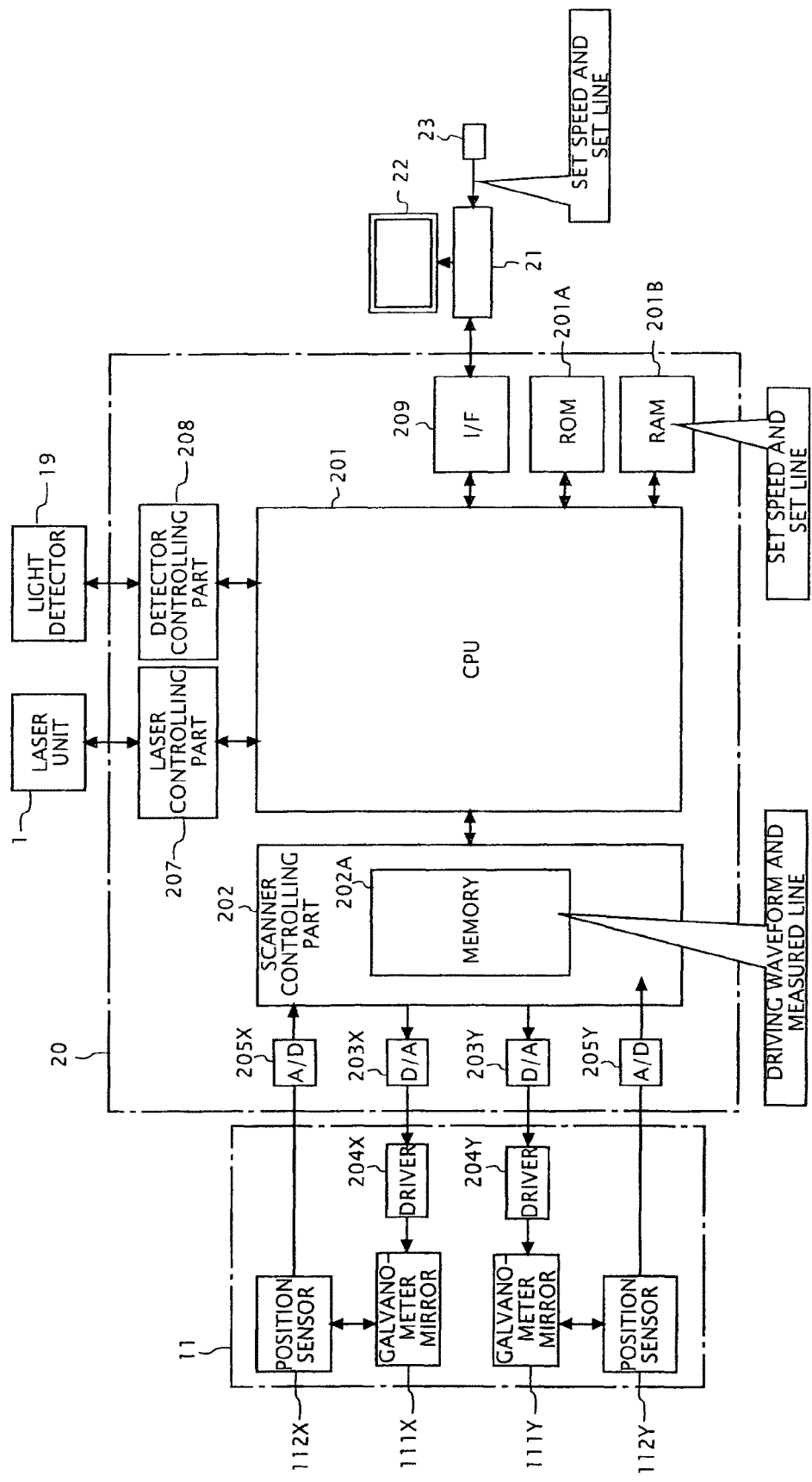
[Fig. 2]

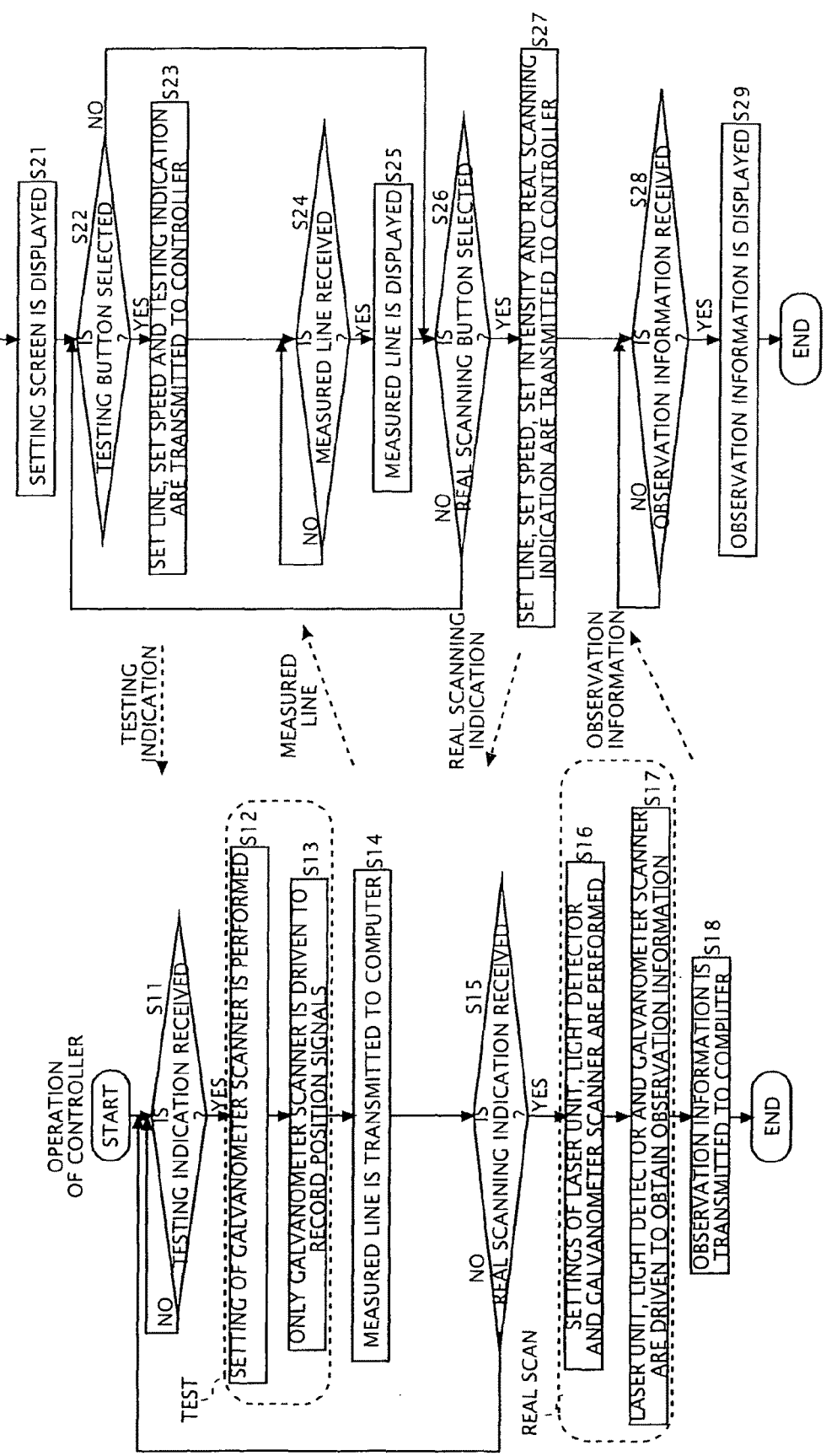

[Fig. 4]
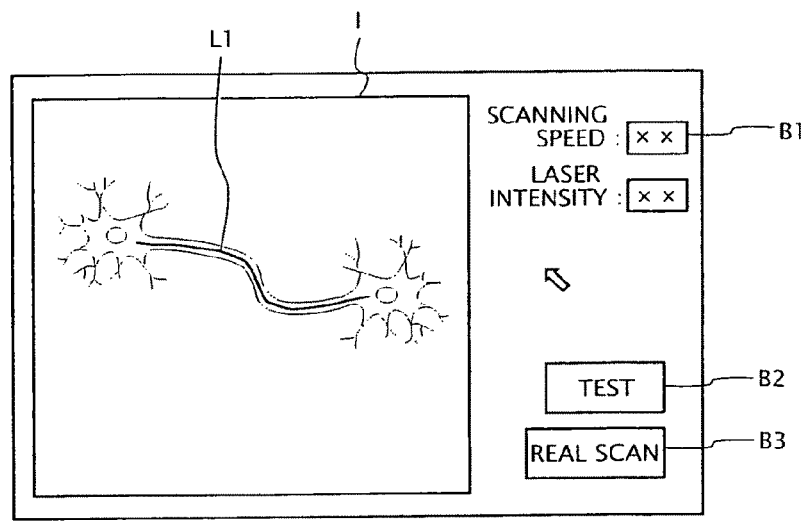
[Fig. 5(a)]
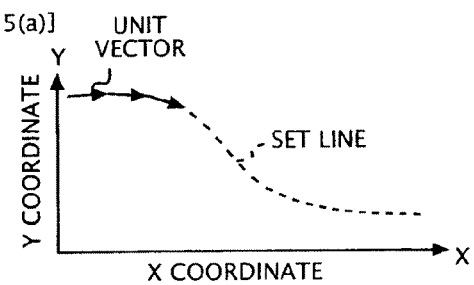
X COMPONENTS ARE CONVERTED INTO VOLTAGE VALUES
Y COMPONENTS ARE CONVERTED INTO VOLTAGE VALUES
[Fig. 5(b)]
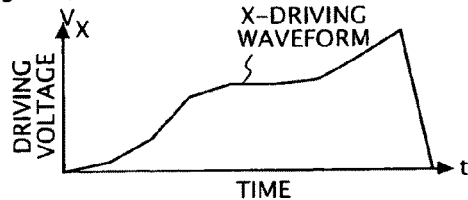
[Fig. 5(c)]
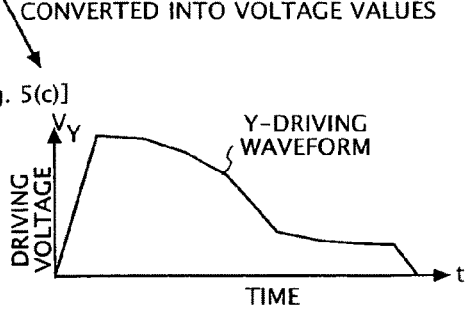

[Fig. 6]
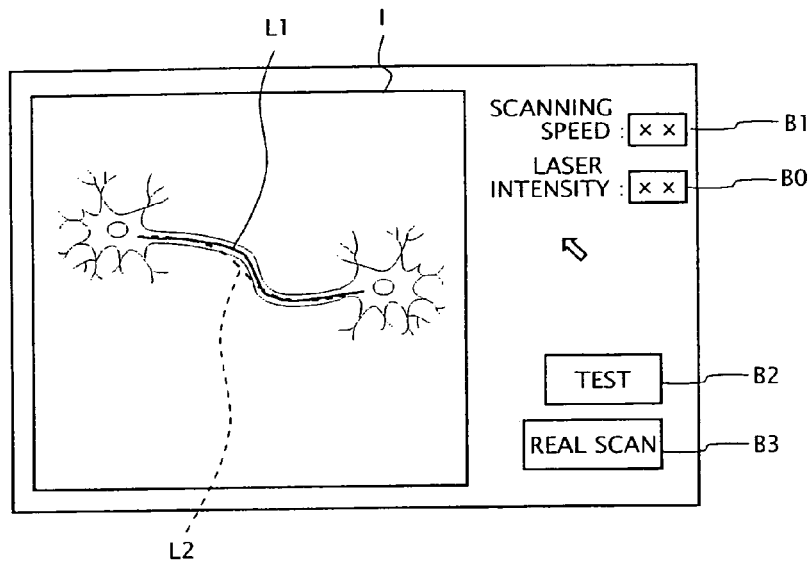
[Fig. 7]
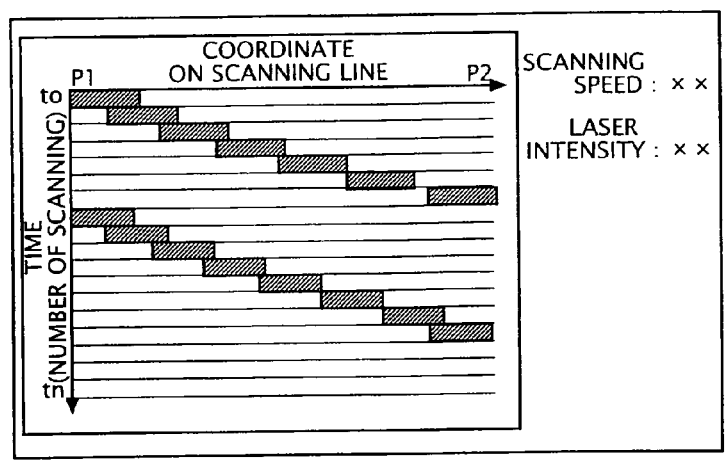

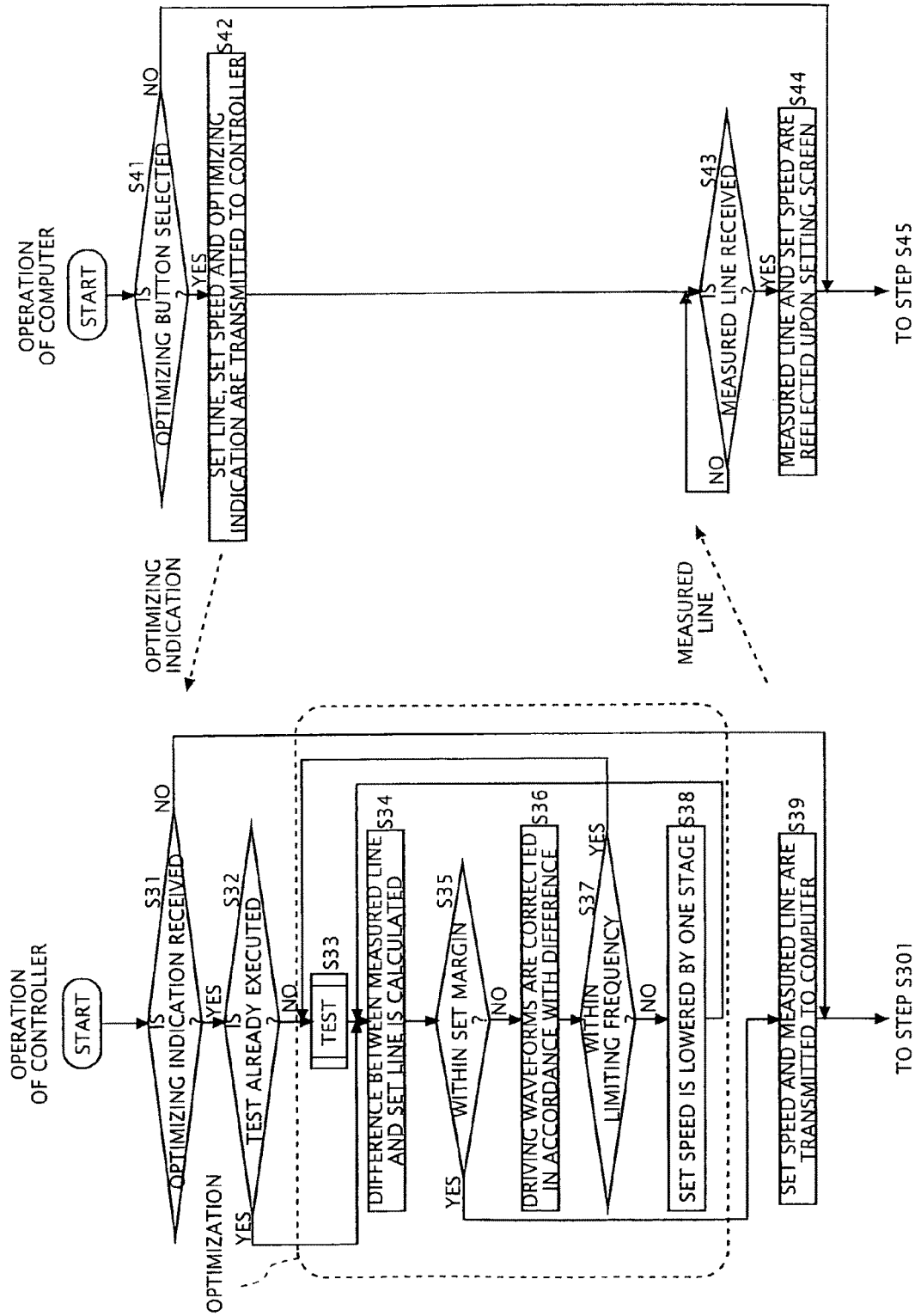

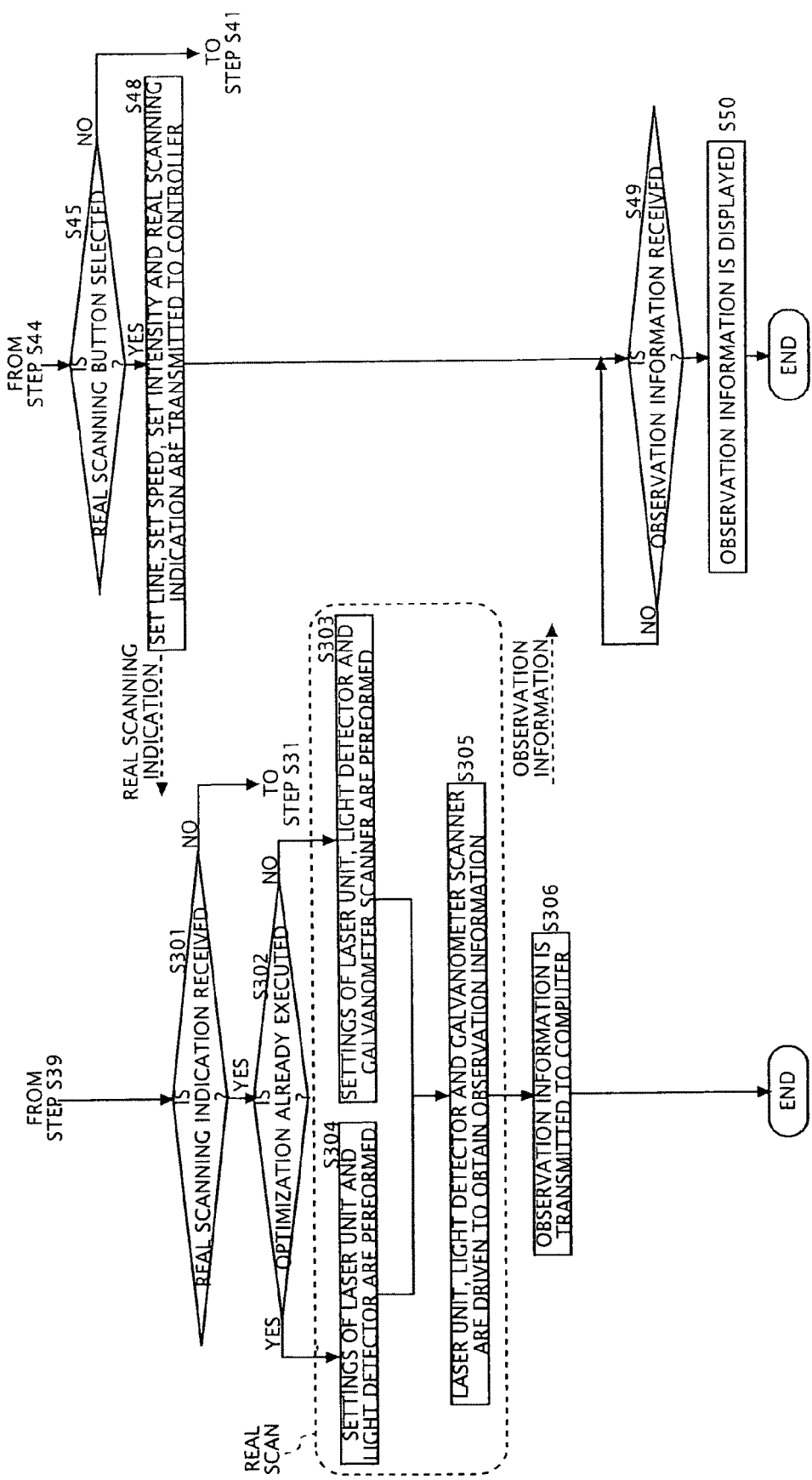

[Fig. 10]
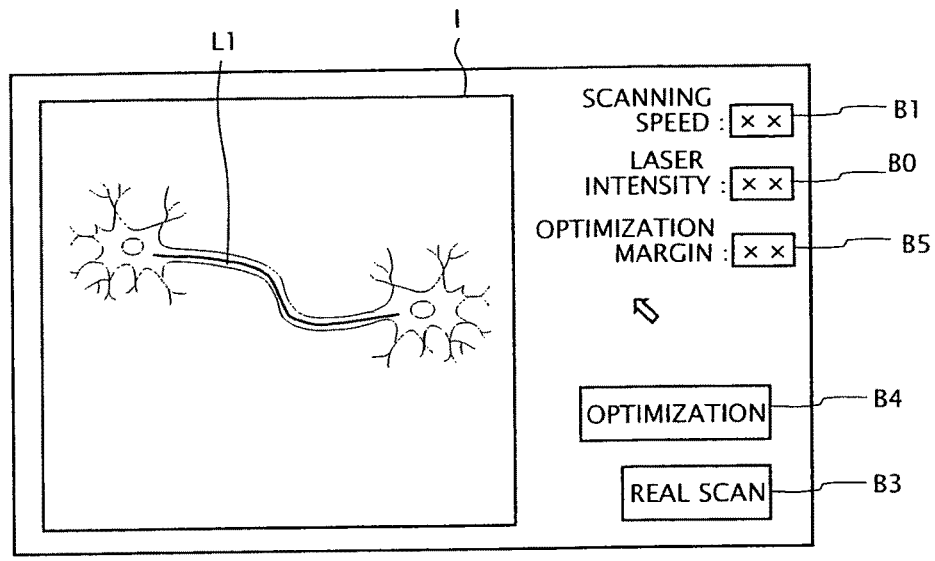
[Fig. 11]
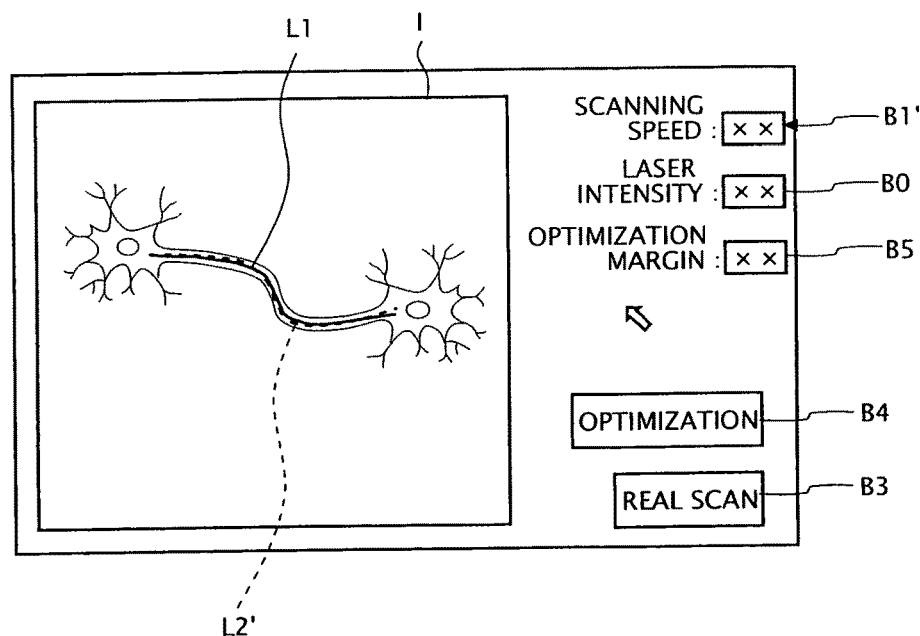

LASER SCANNING APPARATUS AND LASER SCANNING MICROSCOPE

CROSS-REFERENCE TO RELATED APPLICATION

This application is a Continuation Application of International Application No. PCT/JP2007/000656, filed Jun. 20, 2007, designating the U.S., in which the International Application claims a priority date of Jul. 18, 2006, based on prior filed Japanese Patent Application No. 2006-195241, the entire contents of which are incorporated herein by reference.

BACKGROUND

1. Field

The present invention relates to a laser scanning apparatus and a laser scanning microscope.

2. Description of the Related Art

A general laser scanning microscope is provided with a galvanometer mirror which scans in an X direction with laser light over a sample plane and a galvanometer mirror which scans in a Y direction with laser light over the sample plane. If these two galvanometer mirrors are cooperatively controlled, it is also possible to conduct an observation (hereinafter, refer to as "free line observation") in which a scanning trajectory of laser light (hereinafter, refer to as "scanning line") is expressed by a free-form curve. For instance, if the free line observation is conducted with the scanning line so as to trace a cord-shaped axial filament of a nerve cell, it is also possible to capture a high-speed change generated in the axial filament.

However, details of an actual scanning line are not always set as designated by a user. This is because a movement of the galvanometer mirror is dependent not only on a waveform of a driving signal given from an exterior but also on an inertia of the mirror, a steepness of the scanning line, a scanning speed and the like. For this reason, in order to find an optimal scanning condition, the user needs to repeatedly conduct a trial and error process while changing the scanning conditions.

Meanwhile, when a sample is an organism, it is vulnerable to damage, and when the sample is fluorescent-dyed, a color fading occurs, so that a number of irradiations of laser light onto the sample has to be kept to the minimum.

SUMMARY

Accordingly, a proposition of the present invention is to provide a laser scanning apparatus and a laser scanning microscope capable of securely conducting a condition setting at the time of laser scanning while suppressing a damage on a plane to be irradiated.

A laser scanning apparatus of the present invention includes a light deflecting unit disposed in a light path of laser light directed toward a plane to be scanned, user interfaces through which operational contents of the light deflecting unit are designated by a user, generating units generating driving signals of the light deflecting unit in accordance with the designated operational contents, and testing units test-driving the light deflecting unit with the driving signals while keeping the laser light off and measuring the operational contents of the light deflecting unit during the driving.

Further, a laser scanning apparatus of the present invention includes a light deflecting unit disposed in a light path of laser light directed toward a plane to be scanned, user interfaces through which operational contents of the light deflecting unit are designated by a user, generating units generating driving signals of the light deflecting unit in accordance with the designated operational contents, and testing units test-driving the light deflecting unit with the driving signals in a state where an intensity of the laser light is lower than that used when conducting a real scanning over the plane to be scanned and measuring the operational contents of the light deflecting unit during the driving.

Note that the user interfaces preferably notify the user of the measured operational contents.

Further, the laser scanning apparatus of the present invention preferably further includes a correcting unit comparing the measured operational contents with the designated operational contents and correcting the driving signals so that the former operational contents come close to the latter ones.

Further, a laser scanning microscope of the present invention includes the laser scanning apparatus of the present invention and a detector detecting an intensity of light generated at the plane to be scanned.

According to the present invention, a laser scanning apparatus and a laser scanning microscope capable of securely conducting a condition setting at the time of laser scanning while suppressing a damage on a plane to be irradiated are realized.

BRIEF DESCRIPTION OF THE DRAWINGS

FIG. 1 is an entire structural view of the present system.

FIG. 2 is a structural view of a galvanometer scanner 11 and a controller 20.

FIG. 3 illustrates operation flow charts of the controller 20 and a computer 21 at the time of free line observation.

FIG. 4 is a view showing a setting screen.

FIGS. 5(a), 5(b) and 5(c) are views to explain a generating method of driving waveforms.

FIG. 6 is a view showing a setting screen at another timing.

FIG. 7 is a view showing a display example of observation information.

FIG. 8 illustrates operation flow charts (first halves) of the controller 20 and the computer 21 in a second embodiment.

FIG. 9 illustrates operation flow charts (second halves) of the controller 20 and the computer 21 in the second embodiment.

FIG. 10 is a view showing a setting screen in the second embodiment.

FIG. 11 is a view showing a setting screen at another timing in the second embodiment.

DETAILED DESCRIPTION OF THE EMBODIMENTS

[First Embodiment]

Hereinafter, a first embodiment will be explained. The present embodiment is an embodiment of a confocal fluorescence laser scanning microscope system.

First, an entire structure of the present system will be described.

FIG. 1 is an entire structural view of the present system. As shown in FIG. 1, the present system includes a microscope body 100, a controller 20, a computer 21, a monitor 22 and an input device 23 such as a mouse and a keyboard.

In the microscope body 100, a laser unit 1, an optical fiber 7, a collimating lens 8, a dichroic mirror 9, a galvanometer scanner 11, a relay lens 14, an objective lens 15, a sample 16, a collecting lens 17, a pinhole diaphragm for confocal detection 18, a light detector 19 and the like are disposed. The sample 16 is, for example, a fluorescent sample supported on a not-shown stage, and the galvanometer scanner 11 is provided with two galvanometer mirrors (later-described galvanometer mirrors 111X and 111Y) disposed in serial relationship.

Laser light emitted from the laser unit 1 is incident on one end of the optical fiber 7, then propagates inside the optical fiber 7, emitted from the other end of the optical fiber 7, and after being turned into parallel pencil of light by the collimating lens 8, it is incident on the dichroic mirror 9. The laser light passes through the dichroic mirror 9, and after being sequentially reflected by the two galvanometer mirrors of the galvanometer scanner 11, it passes through the relay lens 14 and the objective lens 15 and is condensed to one point on the sample 16. If the galvanometer scanner 11 is driven under this state, the laser light scans over the sample 16.

A fluorescence generated at the light condensed position of the laser light on the sample 16 advances in the opposite direction along the same light path as that of the laser light, toward the dichroic mirror 9. The fluorescence is reflected by the dichroic mirror 9, condensed by the collecting lens 17 and passed through the pinhole diaphragm 18 to thereby remove extra light rays therefrom, and thereafter, it is incident on the light detector 19 and converted into a fluorescence signal.

The controller 20 of the present system synchronously controls the laser unit 1, the galvanometer scanner 11 and the light detector 19, to thereby repeatedly take the fluorescence signals while scanning over the sample 16 with the laser light. The fluorescence signals taken at this time are transmitted to the computer 21 as observation information, and are output to the monitor 22 or stored by the computer 21 if necessary. A user conducts an observation of the sample 16 using the observation information.

Next, structures of the galvanometer scanner 11 and the controller 20 will be specifically described.

FIG. 2 is a structural view of the galvanometer scanner 11 and the controller 20. As shown in FIG. 2, the galvanometer scanner 11 is provided with two galvanometer mirrors 111X and 111Y. When the galvanometer mirror 111X is driven during when the laser light is projected onto the galvanometer scanner 11, the laser light scans over the sample 16 in a predetermined direction (X direction), and when the galvanometer mirror 111Y is driven during when the laser light is projected onto the galvanometer scanner 11, the laser light scans over the sample 16 in a perpendicular direction to the X direction (Y direction).

Between the two mirrors, the galvanometer mirror 111X has a driver 204X as its driving circuit coupled thereto, and the galvanometer mirror 111Y has a driver 204Y as its driving circuit coupled thereto. Further, the galvanometer mirror 111X is provided with a position sensor 112X detecting a mirror position thereof, and the galvanometer mirror 111Y is provided with a position sensor 112Y detecting a mirror position thereof.

The controller 20 includes a scanner controlling part 202 being a control circuit dedicated to the galvanometer scanner 11, a laser controlling part 207 being a control circuit dedicated to the laser unit 1, a detector controlling part 208 being a control circuit dedicated to the light detector 19, a CPU 201 controlling an entire controller 20, an interface circuit 209 performing an interface operation with the computer 21, a ROM 201A storing a program of the CPU 201, and a RAM 201B used for a temporary storage of the CPU 201.

Note that what are indicated by reference numerals 205X and 205Y in FIG. 2 are A/D converters which A/D convert signals output from the galvanometer scanner 11, and what are indicated by reference numerals 203X and 203Y are D/A converters which D/A convert signals output from the scanner controlling part 202.

Next, basic operations of the computer 21, the controller 20 and the galvanometer scanner 11 will be described.

Before the observation, the computer 21 prompts the user to operate the input device 23 to get the user to input scanning conditions. The scanning conditions include at least a scanning line and a scanning speed desired by the user, and a laser intensity or the like desired by the user is normally included therein. The input scanning conditions are transmitted from the computer 21 to the controller 20. The CPU 201 of the controller 20 recognizes the scanning conditions via the interface circuit 209.

The CPU 201 records, in accordance with the recognized scanning conditions, necessary information in the laser controlling part 207, the detector controlling part 208 and the scanner controlling part 202, thereby setting the laser unit 1, the light detector 19 and the galvanometer scanner 11.

Incidentally, in the setting of the galvanometer scanner 11, the CPU 201 generates a waveform of a driving signal to be given to the driver 204X of the galvanometer scanner 11 (hereinafter, refer to as "X-driving waveform") and a waveform of a driving signal to be given to the driver 204Y of the galvanometer scanner 11 (hereinafter, refer to as "Y-driving waveform") based on a set line and a set speed included in the scanning conditions, and stores information on those waveforms in a memory 202A of the scanner controlling part 202A.

Thereafter, when obtaining the observation information, the CPU 201 gives indications to the laser controlling part 207, the detector controlling part 208 and the scanner controlling part 202 under the aforementioned set conditions, to thereby synchronously drive the laser unit 1, the light detector 19 and the galvanometer scanner 11.

At this time, the scanner controlling part 202 generates the driving signals in accordance with the information on the X-driving waveforms stored in the memory 202A and sequentially transmits them to the driver 204X via the D/A converter 203X. Further, the scanner controlling part 202 generates the driving signals in accordance with the information on the Y-driving waveforms stored in the memory 202A and sequentially transmits them to the driver 204Y via the D/A converter 203Y. As a result of this, the galvanometer scanner 11 is driven.

Further, the scanner controlling part 202 samples signals output from the position sensor 112X (hereinafter, refer to as "X-position signals") and signals output from the position sensor 112Y (hereinafter, refer to as "Y-position signals") via the A/D converters 205X and 205Y during the driving of the galvanometer scanner 11, and stores them in the memory 202A. A sampling rate is sufficiently high, and is equal to or higher than a data sampling signal frequency in the controller 20. The X-position signals and the Y-position signals taken as above are effectively utilized at the time of free line observation to be explained next.

Next, operations of the controller 20 and the computer 21 at the time of free line observation will be described.

FIG. 3 illustrates operation flow charts of the controller 20 and the computer 21 at the time of free line observation. An operation program (control program) of the controller 20 is previously stored in the ROM 201A of the controller 20 or the like, and an operation program (management program) of the computer 21 is previously stored in a hard disk of the computer 21 or the like.

(Step S21)

First, in order to get the user to input the scanning conditions such as the scanning line, the scanning speed and the laser intensity under a GUI environment, the computer 21 displays a setting screen as shown in FIG. 4, for instance, on the monitor 22.

As shown in FIG. 4, on the setting screen, an image I of an observation area of the sample 16 (within a field of view of the objective lens 15) is displayed. This image I is obtained by, for example, a normal observation conducted by the present system. The normal observation is for obtaining observation information by setting the laser intensity to low intensity and setting the scanning line to a stripe-shaped one.

Through the operation of the input device 23, the user draws a scanning line L1 and inputs characters indicating a scanning speed B1, a laser intensity B0 and the like on the setting screen.

Note that on the setting screen, a testing button B2, a real scanning button B3 and the like are arranged, and by selecting these buttons at a desired timing, the user can also input a testing indication and a real scanning indication into the computer 21.

(Step S22 YES→S23)

When the testing button B2 is selected, the computer 21 transmits information on the scanning line L1 and that on the scanning speed B1 which were displayed at that moment to the controller 20 respectively as information on the set line and that on the set speed set by the user, together with the testing indication.

(Step S11 Yes→S12)

Upon receiving the information on the set line and the set speed and the testing indication, the CPU 201 of the controller 20 performs a setting of the galvanometer scanner 11 in accordance with the information.

Concretely, the CPU 201 resolves the set line into a plurality of unit vectors as shown in FIG. 5($a$). A size of the unit vector corresponds to an increasing function of the set speed. The CPU 201 generates the X-driving waveform (FIG. 5($b$)) by converting X-components of the resolved set line into voltage values with a predetermined transfer characteristic, and generates the Y-driving waveform (FIG. 5($c$)) by converting Y-components of the resolved set line into voltage values with a predetermined transfer characteristic. The predetermined transfer characteristics are characteristics previously determined by taking response characteristics of the galvanometer mirrors 111X and 111Y into consideration. Further, the CPU 201 stores the generated information on the X-driving waveforms and the Y-driving waveforms in the memory 202A of the scanner controlling part 202.

(Step S13)

The CPU 201 of the controller 20 gives indications to the scanner controlling part 202 under the aforementioned setting conditions to thereby drive the galvanometer scanner 11. However, since the CPU 201 does not drive any of the laser unit 1 and the light detector 19 at this time, there is no chance for the laser light to be incident on the sample 16.

Further, during the driving of the galvanometer scanner 11, the X-position signals and the Y-position signals output from the galvanometer scanner 11 are sampled by the scanner controlling part 202 and sequentially stored in the memory 202A. The stored signals indicate the actual scanning line formed by the galvanometer scanner 11 (a scanning line of laser light when the galvanometer scanner 11 is driven while irradiating the laser light under the same setting condition). Hereinafter, the actual scanning line measured as above is referred to as "measured line" to distinguish it from the set line.

Steps S12 and 13 described above correspond to the test.

(Step S14)

The CPU 201 of the controller 20 calculates the measured line by reading the X-position signals and the Y-position signals stored in the memory 202A and converting them into coordinates on the image I, and transmits information on the measured line to the computer 21.

(Step S24 Yes→S25)

Upon receiving the information on the measured line, the computer 21 displays a measured line L2 together with the scanning line L1 on the setting screen as shown in FIG. 6. Through the display, the user can intuitively recognize a deviation between the scanning line L1 input by himself/herself and the measured line L2.

For instance, when the scanning line L1 is relatively steep and the scanning speed B1 is relatively fast, the measured line L2 is curved more gently than the scanning line L1.

(Step S26 NO→S22)

When the user is not satisfied with the measured line L2, the user is allowed to redraw the scanning line L1 to have a gentle curve or change the scanning speed B1 to a low speed side, and then, select the test button B2 again. When the test button B2 is selected, the aforementioned test is repeated.

(Step S26 Yes→S27)

When the user is satisfied with the measured line L2, the user just had to select the real scanning button B3. When the real scanning button B3 is selected, the computer 21 transmits the information on the scanning line L1, the scanning speed B1 and the laser intensity B0 which were displayed at that moment to the controller 20 as the information on the set line, the set speed and set intensity set by the user, together with the real scanning indication.

(Step S115 Yes, S16)

Upon receiving the information on the set line, the set speed and the set intensity and the real scanning indication, the CPU 201 of the controller 20 performs settings of the laser unit 1, the galvanometer scanner 11 and the light detector 19 in accordance with these pieces of information. Incidentally, if values of the set line and the set speed are the same as those of the last time, the setting of the galvanometer scanner 11 is omitted.

(Step S17)

Under the aforementioned setting conditions, the CPU 201 of the controller 20 gives indications to the laser controlling part 207, the detector controlling part 208 and the scanner controlling part 202, to thereby synchronously drive the laser unit 1, the light detector 19 and the galvanometer scanner 11 to obtain observation information. The obtainment of the observation information is continuously and repeatedly performed at a plurality of times, for instance. The above-described steps S16 and 17 correspond to the real scanning.

(Step S18)

The CPU 201 of the controller 20 transmits the observation information obtained in the real scanning to the computer 21 together with information on scanning conditions at the time of real scanning and the like.

(Step S28 Yes→S29)

Upon receiving the observation information, the computer 21 displays the observation information on the monitor 22 as shown in FIG. 7, for example. FIG. 7 is a view in which respective pieces of scanning line information obtained by performing a laser scanning from a start point P1 to an end point P2 of the measured line L2 from time t0 to tn at a plurality of times are arranged lengthwise in time series. According to such a display, it is apparent that a part in which a reaction is detected (black-out part) gradually shifts from P1 to P2 (the above description corresponds to step S29).

As described above, in the test (steps S12 and 13) of the present system, only the galvanometer scanner 11 is driven under the scanning conditions designated by the user without irradiating laser light and the actual scanning line (measured line) at that time is measured. Accordingly, in this test, it is possible to obtain information on the measured line while preventing color fading and damage of the sample 16.

Subsequently, the measured line L2 is displayed on the monitor 22 after the test (refer to FIG. 6), so that the user can determine whether the scanning conditions set by himself/herself are good or bad, and can give desired indications such as a change in the scanning conditions and executions of a real scanning and a retest, to the present system.

Further, in the present system, the scanning line L1 set by the user is displayed together with the measured line L2 (refer to FIG. 6), so that the user can intuitively recognize a deviation between the both lines.

[Second Embodiment]

Hereinafter, a second embodiment will be described. The present embodiment is an embodiment of a confocal fluorescence laser scanning microscope system. Here, only a point of difference between this embodiment and the first embodiment will be described. The point of difference is that an optimizing function which automatically corrects details of the scanning conditions is mounted.

For this reason, operations shown in FIG. 8 and FIG. 9 are added to the operations of the controller 20 and the computer 21 of the present system, and an optimizing button B4 is arranged on the setting screen as shown in FIG. 10. Further, on the setting screen, a region into which the user inputs a desired optimization margin B5 is also provided. The optimization margin refers to a tolerance of deviation between the measured line after the optimization and the set line, and is expressed by, for instance, the number of pixels on the image I, or the like.

Hereinafter, the operations shown in FIG. 8 and FIG. 9 are specifically described.

(Step S41 YES→S42)

When the optimizing button B4 is selected, the computer 21 transmits information on the scanning line L1, the scanning speed B1 and the optimization margin B5 which were displayed at that moment to the controller 20 as the information on the set line, the set speed and set margin set by the user, together with an optimizing indication.

(Step S31)

Upon receiving the information on the set line, the set speed and the set margin and the optimizing indication, the CPU 201 of the controller 20 determines whether the test (steps S12 and S13 in FIG. 3) with the set line and the set speed is already executed or not.

(Step S32 NO→S33)

If the test is not yet executed, the CPU 201 of the controller 20 executes a test with the set line and the set speed. This test is conducted in the same manner as in steps S12 and S13.

(Step S32 Yes)

If the test is already executed, the CPU 201 of the controller 20 skips step S33 and proceeds to step S34.

(Step S34)

The CPU 201 of the controller 20 calculates the measured line by reading the X-position signals and the Y-position signals stored in the memory 202A at that moment and converting them into coordinates on the image I.

Further, the CPU 201 of the controller 20 subtracts the measured line from the set line set by the user, thereby calculating a difference between the both lines. At this time, the CPU 201 resolves each of the measured line and the set line into a plurality of unit vectors and then calculates a difference in X-direction and a difference in Y-direction, respectively, by each unit vector. A size of the unit vector corresponds to an increasing function of the set speed, and is the same as the one used when generating the driving waveform of the galvanometer scanner 11.

(Step S35)

The CPU 201 of the controller 20 determines whether or not a magnitude of the calculated difference falls within the set margin set by the user.

(Step S35 NO→S36)

If the magnitude of difference does not fall within the set margin, the CPU 201 of the controller 20 obtains a correction amount $\Delta V_X(t)$ of the X-driving waveform by converting the difference in X-direction into a voltage value using a predetermined transfer characteristic. Further, the CPU 201 obtains a correction amount $\Delta V_Y(t)$ of the Y-driving waveform by converting the difference in Y-direction into a voltage value using a predetermined transfer characteristic. Note that the predetermined transfer characteristics are the same as those used when generating the driving waveforms of the galvanometer scanner 11.

Further, the CPU 201 adds the correction amount $\Delta V_X(t)$ to the X-driving waveform stored in the memory 202A at that moment, thereby correcting the X-driving waveform. Further, the CPU 201 adds the correction amount $\Delta V_Y(t)$ to the Y-driving waveform stored in the memory 202A at that moment, thereby correcting the Y-driving waveform.

(Step S37)

The CPU 201 of the controller 20 determines whether or not changed frequencies of the X-driving waveform and the Y-driving waveform after the correction fall within a limiting frequency of the galvanometer scanner 11. Here, the limiting frequency is determined based on the set speed set by the user and response characteristics of the galvanometer mirrors 111X and 111Y, and it becomes small as the set speed becomes faster.

(Step S37 NO→S38)

If the changed frequencies of the X-driving waveform and the Y-driving waveform after the correction do not fall within the limiting frequency, the set speed is lowered by one stage, and thereafter, the procedure goes back to step S34 and a calculation of difference is performed again.

(Step S37 Yes→S33)

If the changed frequencies of the X-driving waveform and the Y-driving waveform after the correction fall within the limiting frequency, the procedure goes back to step S33, and a retest is conducted using the corrected X-driving waveform and Y-driving waveform. The above-described steps S33 through S38 correspond to the optimization.

(Step S35 YES→S39)

Thereafter, if the magnitude of difference calculated in step S34 falls within the set margin, the CPU 201 of the controller 20 terminates the optimization, and transmits information on the set speed and the measured line after optimization to the computer 21. Note that the calculation method of the measured line is the same as described above.

(Step S43 YES→S44)

Upon receiving the information on the set speed and the measured line after optimization, the computer 21 reflects these pieces of information upon the setting screen as shown in FIG. 11, for instance. In FIG. 11, what is indicated by the reference numeral B1' is the set speed after optimization and what is indicated by the reference numeral L2' is the measured line after optimization. Accordingly, the user can recognize a result of the optimization.

(Step S45 Yes→S48)

After that, when the real scanning button B3 is selected, the computer 21 transmits information on the scanning line L1, the scanning speed B1', the laser intensity B0 and the optimization margin B5 which were displayed at that moment to the controller 20 as the information on the set line, the set speed, the set intensity and the set margin set by the user, together with the real scanning indication.

(Step S301 YES→S302)

Upon receiving the information on the set line, the set speed, the set intensity and the set margin and the real scanning indication, the CPU 201 of the controller 20 determines whether the optimization with the set line, the set speed and the set margin is already executed or not.

(Step S302 No→S303)

If the optimization is not yet executed, the CPU 201 of the controller 20 performs settings of the laser unit 1, the light detector 19 and the galvanometer scanner 11 in accordance with the set line, the set speed and the set intensity.

(Step S302 Yes)

Meanwhile, if the optimization is already executed, the CPU 201 of the controller 20 performs settings of only the laser unit 1 and the light detector 19 in accordance with the set line, the set speed and the set intensity, and stores the set contents (driving waveforms) of the galvanometer scanner 11 while keeping them as they were optimized.

(Step S305)

Under the aforementioned setting conditions, the CPU 201 of the controller 20 gives indications to the laser controlling part 207, the detector controlling part 208 and the scanner controlling part 202, to thereby synchronously drive the laser unit 1, the light detector 19 and the galvanometer scanner 11 to obtain observation information. The obtainment of the observation information is continuously and repeatedly performed at a plurality of times, for instance. The above-described steps S303, 304 and 305 correspond to the real scanning.

(Step S306)

The CPU 201 of the controller 20 transmits the observation information obtained in the real scanning to the computer 21 together with the scanning conditions at the time of real scanning and the like.

(Step S49 Yes→S50)

Upon receiving the observation information, the computer 21 displays the observation information on the monitor 22. A display method at this time is the same as that shown in FIG. 7, for instance (the above description corresponds to step S50).

As described above, in the optimization of the present system (steps S33 through S38), the test and the correction of the driving waveforms are repeatedly conducted until the difference between the measured line and the set line falls within the set margin (until the determination of step S35 becomes YES) (step S36). By the repetition, values of the driving waveforms gradually become close to optimal values. Further, in this optimization, the set speed is changed to the low-speed side according to demand, to thereby obtain the optimal values. Therefore, according to the optimization of the present system, details of the scanning conditions are automatically optimized.

Note that in step S34 of the present system, the difference between the measured line and the set line is calculated and then the difference is converted into the voltage value, but, it is possible that the measured line and the set line are converted into the voltage values and then the difference between the both is calculated. However, in such a case, it becomes necessary to convert a judgment standard (set margin) in step S35 into the voltage value, and the conversion in step S36 becomes unnecessary.

Further, in the optimization of the present system (steps S33 through S38), the test and the correction of the driving waveforms are repeatedly conducted until the difference between the measured line and the set line falls within the set margin (until the determination of step S35 becomes YES), but, they may be repeatedly conducted at previously determined number of times. Further, the number of repetition may be designated by the user.

Further, in the real scanning of the present system (steps S303 through S305), the driving waveforms after optimization are automatically adopted when the optimization is already executed, but, it is also possible to get the user to select whether the driving waveforms after optimization are adopted or driving waveforms which are regenerated are adopted, and then to follow a result of the selection.

Further, the controller 20 and the computer 21 of the present system may be operated as follows after the optimization.

The CPU 201 of the controller 20 transmits information on the driving waveforms after optimization to the computer 21. The computer 21 stores the received information on the driving waveforms in accordance with an indication from the user. At this time, the information on the driving waveforms is corresponded to information on the image I of the sample 16. Thereafter, when an indication to recall the driving waveforms is made from the user, the stored information on the driving waveforms is read and transmitted to the controller 20. In such a case, the controller 20 writes the received driving waveforms into the memory 202A to thereby perform a setting of the galvanometer scanner 11. According to such operations, the number of executions of the processing regarding the optimization can be kept to the minimum. Further, the user can use the driving waveforms after optimization by recalling them at a desired timing.

Further, in the first and second embodiments, examples in which only the galvanometer scanner 11 is driven under the state where no laser is irradiated from the laser unit 1 when calculating the measured line are shown, but, the present invention is not limited to this and it is possible that the galvanometer scanner 11 is driven under the state where laser having an intensity lower than that of laser light irradiated in the real scanning is irradiated from the laser unit 1. It is possible to suppress the color fading and damage of the sample 16 only by setting an intensity of laser light to one being lower than that of the laser light used when performing a real scanning as described above.

[Other Features]

Note that the aforementioned microscope body 100 is a laser scanning microscope having both the function of fluorescence detection and the function of confocal detection, but, the present invention is also applicable to a laser scanning microscope which does not have either or both of the function of fluorescence detection and the function of confocal detection. Further, the present invention can be also applied to a laser scanning apparatus which does not have the detection function.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claims is:

1. A laser scanning apparatus, comprising:
a light deflecting unit disposed in a light path of laser light directed toward a plane to be scanned;
user interfaces displaying an observation image of a sample being placed on the plane to be scanned and allowing a user to designate a desired scanning trajectory of the laser light at least within the observation image as desired operational contents of the light deflecting unit;
generating units generating driving signals of the light deflecting unit in accordance with the designated desired operational contents; and
testing units test-driving the light deflecting unit with the driving signals while keeping the laser light off and measuring actual operational contents of the light deflecting unit during the driving, wherein
the user interfaces display the designated desired scanning trajectory of the laser light on the observation image and display the actual operational contents being measured as an actual scanning trajectory of the laser light on the observation image.

2. The laser scanning apparatus according to claim 1, wherein
the desired scanning trajectory is a free-form curve.

3. The laser scanning apparatus according to claim 1, further comprising
a correcting unit comparing the actual operational contents being measured with the designated desired operational contents and correcting the driving signals so that the former operational contents come close to the latter ones.

4. A laser scanning microscope, comprising:
the laser scanning apparatus according to claim 1; and
a detector detecting an intensity of light generated from the sample.

5. A laser scanning apparatus, comprising:
a light deflecting unit disposed in a light path of laser light directed toward a plane to be scanned;
user interfaces displaying an observation image of a sample being placed on the plane to be scanned and allowing a user to designate a desired scanning trajectory of the laser light at least within the observation image as desired operational contents of the light deflecting unit;
generating units generating driving signals of the light deflecting unit in accordance with the designated desired operational contents; and
testing units test-driving the light deflecting unit with the driving signals in a state where an intensity of the laser light is lower than that used when conducting a real scanning over the plane to be scanned and measuring actual operational contents of the light deflecting unit during the driving, wherein
the user interfaces display the designated desired scanning trajectory of the laser light on the observation image and display the actual operational contents being measured as an actual scanning trajectory of the laser light on the observation image.

6. The laser scanning apparatus according to claim 5, wherein
the desired scanning trajectory is a free-form curve.

7. The laser scanning apparatus according to claim 5, further comprising
a correcting unit comparing the actual operational contents being measured with the designated desired operational contents and correcting the driving signals so that the former operational contents come close to the latter ones.

8. A laser scanning microscope, comprising:
the laser scanning apparatus according to claim 5; and
a detector detecting an intensity of light generated from the sample.

* * * * *